United States Patent [19]

Hirao et al.

[11] Patent Number: 4,924,317
[45] Date of Patent: May 8, 1990

[54] VIDEO CAMERA WITH AN AUTOMATIC FOCUSING SYSTEM

[75] Inventors: Yoshiaki Hirao, Habikino; Ryuichiro Kuga, Katano; Masayuki Yoneyama; Shusuke Ono, both of Takatsuki, all of Japan

[73] Assignee: Matsushita Electric Industrial Co., Ltd., Osaka, Japan

[21] Appl. No.: 254,683

[22] Filed: Oct. 7, 1988

[30] Foreign Application Priority Data

Oct. 8, 1987 [JP] Japan ................................ 62-254199

[51] Int. Cl.$^5$ .......................................... H04N 5/232
[52] U.S. Cl. ................................................. 358/227
[58] Field of Search ................ 358/227; 354/400, 402, 354/404

[56] References Cited

U.S. PATENT DOCUMENTS

| 4,370,038 | 1/1983 | Kimura | 358/227 |
| 4,414,575 | 11/1988 | Yamamoto et al. | 358/227 |
| 4,484,806 | 11/1984 | Onishi et al. | 358/227 |
| 4,575,764 | 3/1986 | Stauffer | 358/227 |
| 4,745,484 | 5/1988 | Drexler et al. | 358/227 |

Primary Examiner—Jin F. Ng
Assistant Examiner—Stephen Brinich
Attorney, Agent, or Firm—Wenderoth, Lind & Ponack

[57] ABSTRACT

A video camera has an automatic focusing system provided with a focus detecting section for calculating and outputting a focus signal corresponding to a focus condition of an picked-up image from a video signal produced by an image pickup element. Either the image pickup element or a focusing lens in a photographic lens is oscillated back and forth of its present position, as needed, to detect an in-focus direction at the moment. The focusing lens is moved in the in-focus direction up to a position at which an optimum focus condition is obtained.

17 Claims, 7 Drawing Sheets

VIDEO CAMERA WITH AN AUTOMATIC FOCUSING SYSTEM

BACKGROUND OF THE INVENTION

1. Field of the Invention

The present invention relates to a video camera having an automatic focusing system for automatically focusing an image of an object to be photographed into an optimum focused condition.

2. Description of the Prior Art

Methods have already been proposed and practised for making automatic focusing (autofocus) which is an important function of a video camera. Among them is included a so-called "in-focus control method" which utilizes a video signal in a video camera. An example is reported in detail in an article entitled "Automatic Focusing in TV Camera using In-Focus Control Servo System" by Ishida et al., "NHK Technical Journal" Vol. 17, No. 1 (1965), p. 21.

In the "in-focus control method" mentioned above, a photographic lens is moved, and, on the basis of a change in level of a high frequency component of a certain frequency or higher contained in a video signal from an object (hereinafter referred to as "high frequency component"), a direction in which the photographic lens is to be moved for focusing (hereinafter referred to as "in-focus direction") and an in-focus position are detected. According to this method, as long as the photographic lens does not move, it is basically not clear in which direction, before or behind the present position, the in-focus position is present. Consequently, the photographic lens will often be moved in a defocusing direction at the time of start-up of the automatic focusing mechanism or upon movement of the object. This lowers the response speed of focusing operation extremely.

SUMMARY OF THE INVENTION

It is an object of the present invention to provide a video camera having an automatic focusing system which is stable and superior in response characteristic at all times.

This object can be achieved by a video camera which comprises: photographing means for picking up an image of an object, said photographing means comprising a photographic lens including a focusing lens for focusing a light from said object, and image pickup means for converting an image formed thereon by the light passed through said photographic lens to an electric signal; signal processing means for processing said electric signal to obtain therefrom a video signal; focus detecting means for detecting a focus condition of the image on said image pickup means from said video signal and outputting a focus signal indicative of the detected focus condition; driving means for moving said focusing lens along an optical axis of said photographic lens thereby to adjust focus and for driving said photographing means to cause an auxiliary oscillation which is a cyclic change of the focus condition of the image on said image pickup means thereby to change said focus signal; control means for controlling said driving means such that said control means sends a command to said driving means to cause said auxiliary oscillation for a predetermined period to detect an in-focus direction in which said focusing lens is to be moved from a change of said focus signal caused by said auxiliary oscillation, and sends another command to said driving means to execute an in-focus control operation in which said focusing lens is moved by said driving means in said in-focus direction so that said focus condition becomes an optimum condition.

In an preferred embodiment, the driving means has an independent auxiliary oscillation means for oscillating the image pick means along the optical axis of the photografic lens under control of the control means thereby to effect the auxiliary oscillation. In another preferred embodiment, the driving means causes the focusing lens to oscillate along the optical axis under control of the control means thereby to effect the auxiliary oscillation.

With the above construction, the auxiliary oscillation is executed only when it is necessary to detect an in-focus direction in which the focusing lens is to be driven, and the focusing lens is driven up to a position corresponding to the best focus condition on the basis of the results of the detection performed by the focus signal detecting section, followed by stopping. By executing such in-focus control operation it is possible to effect a stable and highly responsive automatic focusing.

DESCRIPTION OF THE PREFERRED EMBODIMENTS

Figure 1:
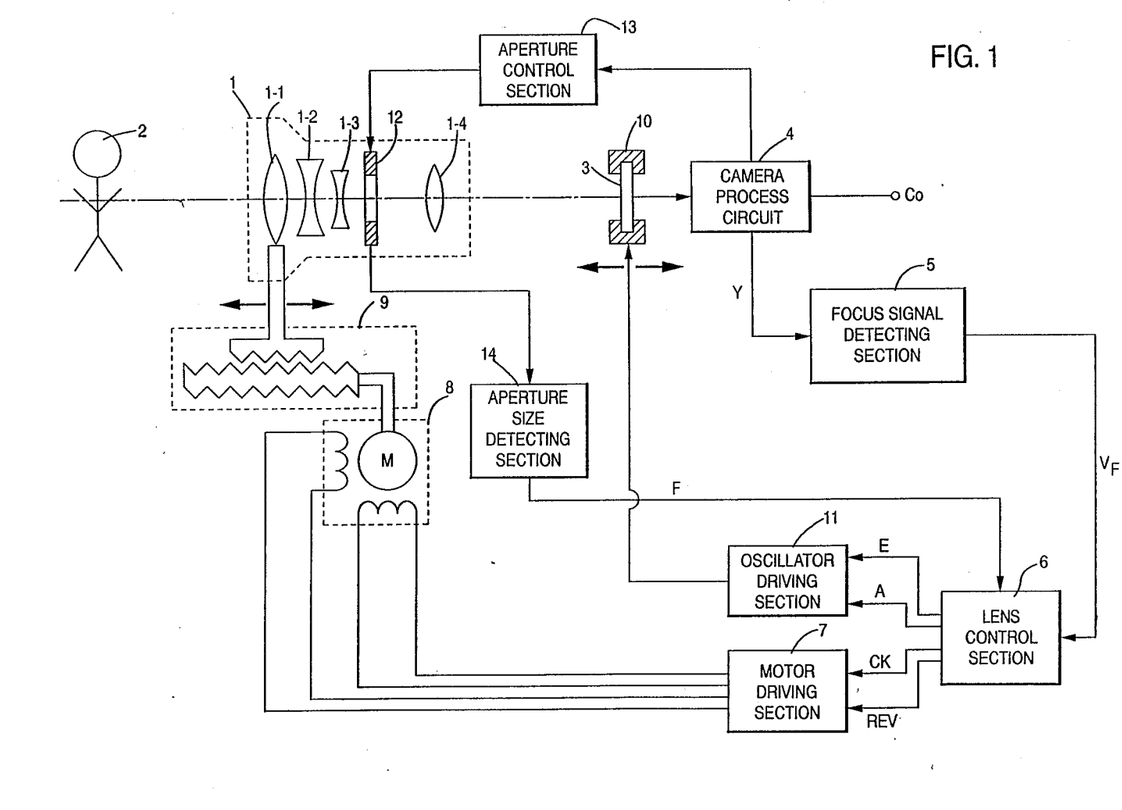
FIG. 1 is a block diagram of a video camera according to a first embodiment of the present invention.

In FIG. 1, showing an example of video camera of the present invention, a zoom lens 1 is composed of four lens groups 1-1 to 1-4. Each lens group is shown by a single convex or concave lens for convenience' sake, but may be actually constituted by plural convex or concave lenses. An image of an object 2 enters a CCD 3 through the zoom lens 1. A camera process circuit 4 applies various known signal processings to an electric signal provided from the CCD 3 and outputs a video signal (e.g. NTSC signal) Co. A focus signal detecting section 5 calculates and outputs a focus signal VF corresponding to a focus condition of the photographic lens 1 at field intervals of the video signal in accordance with a luminance signal Y provided from the camera process circuit 4. A lens control section 6 holds two values of the focus signal VF in the preceding two fields from the focus signal detecting section 5, calculates a difference value ($\Delta$VF) between the two, judges an in-focus condition of the photographic lens on the basis of the sign and absolute value of the difference value ΔVF, and provides to a motor driving section 7 a clock signal CK and a forward-reverse signal REV which signals specify driving speed and direction for a stepping motor 8. The motor driving section 7 drives the stepping motor 8 in accordance with the clock signal CK and the forward-reverse signal REV, which stepping motor 8 in turn causes the first group 1-1 of the zoom lens 1 to move up to a predetermined position through a transfer mechanism 9, thereby to execute automatic focusing operation.

The operation of the in-focus control is as described above. Now, the operation of the auxiliary oscillation will be explained below, including explanation on how the response characteristic of the photographic lens is improved in the focusing process.

The CCD 3 is mechanically connected to an oscillator 10 so as to oscillate along the optical axis of the zoom lens 1 during oscillation of the oscillator. In the execution of the auxiliary oscillation, the lens control section 6 issues a command (CK=0) for once stopping the stepping motor 8 forcibly and at the same time provides to an oscillator driving section 11 an auxiliary oscillation execution signal E for oscillating the CCD 3 in front and in the rear of its present position at cycles of four fields and an auxiliary oscillation amplitude signal A which specifies an oscillation amplitude of the auxiliary oscillation, in synchronism with a vertical synchronizing signal in the video signal provided from the camera process circuit 4. Once such auxiliary oscillation is executed, there are obtained focus signals each in one field period in the present focal position of the zoom lens 1 and in front and rear positions with respect to the present position to detect an in-focus direction.

The lens control section 6 causes the auxiliary oscillation to be executed in each of the following cases.

(1) When electric power is fed to the automatic focusing system to start the automatic focusing operation.

(2) When, after the photographic lens is focused by the above in-focus control operation, the object or the video camera move and automatic focusing is to be restarted.

Both the above cases require an in-focus direction judging function which cannot be effected by the automatic focusing under the conventional in-focus control. The auxiliary oscillation may be executed also in the following cases in addition to the above cases and this is effective in improving the response characteristic of the photographic lens.

(3) When the photographic lens is focused by the above in-focus operation and an automatic focusing completed, the period from this completion until restart of automatic focusing.

(4) In the above in-focus control operation, the period until completion of automatic focusing.

In the above case (3), the lens control section 6 causes the CCD 3 to perform the auxiliary oscillation continuously in accordance with the auxiliary oscillation execution signal E until movement of the object is recognized. Thus, after the completion of an automatic focusing, the auxiliary oscillation is executed to continually monitor whether or not the object has moved, thereby making it possible to quickly respond to the movement of the object or movement of the video camera.

In the above case (4), the lens control section 6 discontinues (CK=0) the in-focus control operation for a preset certain period in the same operation, at the same time it outputs an auxiliary oscillation execution signal E, and after an in-focus direction is confirmed by the auxiliary oscillation, the lens control section 6 again causes the in-focus control operation to be executed. Thus, the in-focus control operation is executed while detecting the in-focus direction, whereby not only the automatic focusing operation is held in a stable state but also it is possible to prevent overrun of the photographic lens.

Figure 2:
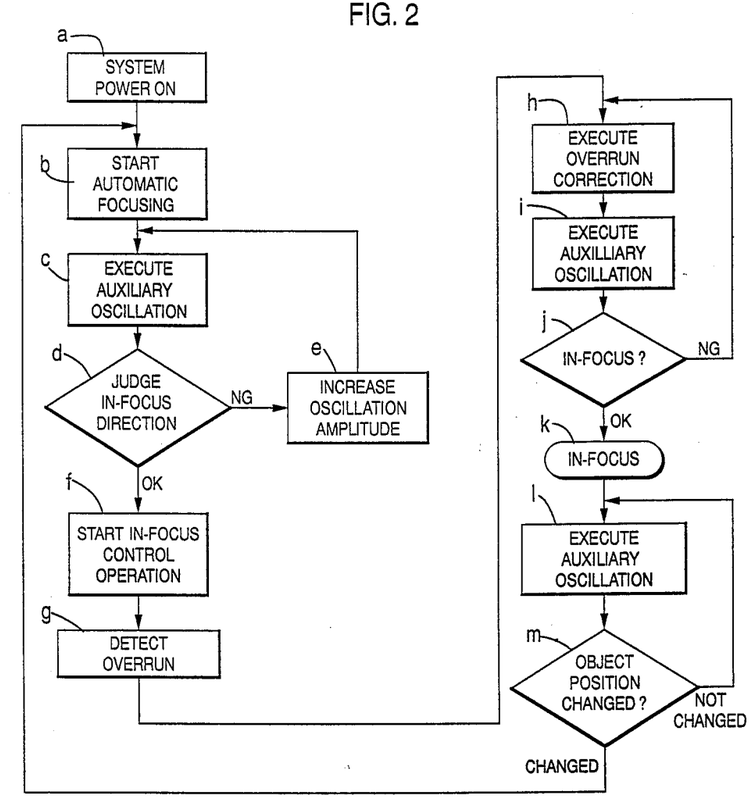
FIG. 2 is a flow chart showing the operation of an automatic focusing system in the video camera of the present invention.

FIG. 2 shows an algorithm of automatic focusing control in this embodiment. In the same figure, in steps (a) to (e), when electric power is fed to the automatic focusing system, an auxiliary oscillation is executed at an amplitude specified by the auxiliary oscillation amplitude signal A. After the auxiliary oscillation is executed for only one cycle in step (c), an in-focus direction is judged in step (d). When the in-focus direction is detected, the in-focus control operation is started in step (f), while when it is not detected, the amplitude of the auxiliary oscillation is enhanced in accordance with a preset algorithm in step (e) and the auxiliary oscillation of step (c) is executed again.

As the in-focus control operation of step (f) proceeds, the focus is gradually adjusted, but there soon occurs overrun. This is detected from an increase to decrease tendency of the focus signal VF in step (g). Upon detection of the overrun there is executed overrun correction for moving back the first group 1-1 of the zoom lens 1 by a present certain amount in step (h). Than, an auxiliary oscillation is executed in step (i) and the in-focus condition is confirmed in step (j).

The in-focus-or-not judgment is made on the basis of the difference between focus signals VF in front and in the rear of the present focal position obtained by the auxiliary oscillation. Where the answer is negative because of insufficient overrun correction, execution returns to step (h) to perform the overrun correction again.

After confirmation of an in-focus condition in step (k), the auxiliary oscillation is executed at predetermined intervals in step (l) and there is made calculation on focus signals. VF in front and in the rear of the present focal position to monitor whether or not the object position has changed in step (m). When such change is detected, the automatic focusing operation is again started in step (b).

Explanation will now be made about in what manner the oscillation amplitude of the auxiliary oscillation is determined in this embodiment. In FIG. 1, the aperture size of a diaphragm mechanism 12 of the zoom lens 1 (i.e., F number) is adjusted by an aperture control section 13 so that the level of a luminance signal Y produced in the interior of the camera process circuit 4 becomes equal to a preset reference value. An aperture size detecting section 14 detects the aperture size of the diaphragm mechanism 12 and inputs it to the lens control section 6 as an aperture size signal F corresponding to the aperture size. The lens control section 6 contains a correspondence table showing correspondence between the aperture size signal F and the auxiliary oscillation amplitude signal A, and it outputs an auxiliary oscillation amplitude signal A according to an aperture size signal F which is inputted from the aperture size detecting section 14.

The depth of focus of the photographic lens is generally inverse proportional to the lens aperture size F, so in the above correspondence table the values of the auxiliary oscillation amplitude signal A are set to be inverse proportional to the values of the aperture size signal F. The lens control section 6 in this embodiment can actually be constituted simply using a microprocessor and the above correspondence table is constituted by an ROM (Read Only Memory). For the aperture size detecting section 14 there may be utilized a known method wherein the displacement of the diaphragm mechanism 12 is detected using a Hall element.

Figure 3:
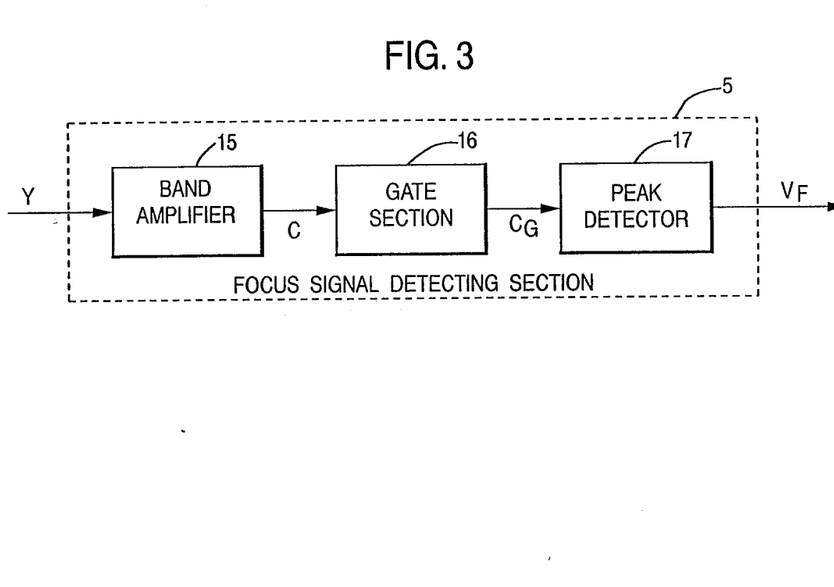
FIG. 3 is a block diagram showing an example of focus signal detecting section in the first embodiment.

FIG. 3 is a block diagram showing a concrete construction of the focus signal detecting section 5. The focus signal detecting section 5 is composed of a high band amplifier 15, a gate portion 16 and a peak detector 17. The band amplifier 15 picks up and amplifies a frequency component of the luminance signal Y provided from the camera process circuit 4 Here, the output of the band amplifier 15 is indicated by C. The gate portion 16 gates and picks up only a high-frequency component portion corresponding to a certain range of one field of the video signal. Here, the output of the gate portion 16 is indicated by $C_G$. The peak detector 17 detects the maximum level of the high frequency component gated in each field period and outputs it at field intervals, which output is the foregoing focus signal VF. The oscillator 10 may be a known piezo-actuator using a piezoelectric element.

Now, how to control the auxiliary oscillation and the effect thereof will be explained with reference to FIG. 4. In FIGS. 4(a), (b), (c) and (d), the axes of abscissa all represent time, t. FIG. 4(a) shows a waveform with time of the auxiliary oscillation execution signal E provided from the lens control section 6. In this embodiment, during 4 tv of (3 tv/2) to (11 tv/2) (tv represents one field period, namely, 1/60 second in the case of NTSC system), the auxiliary oscillation execution signal E becomes high ("H") level so the auxiliary oscillation is executed one cycle.

Figure 4:
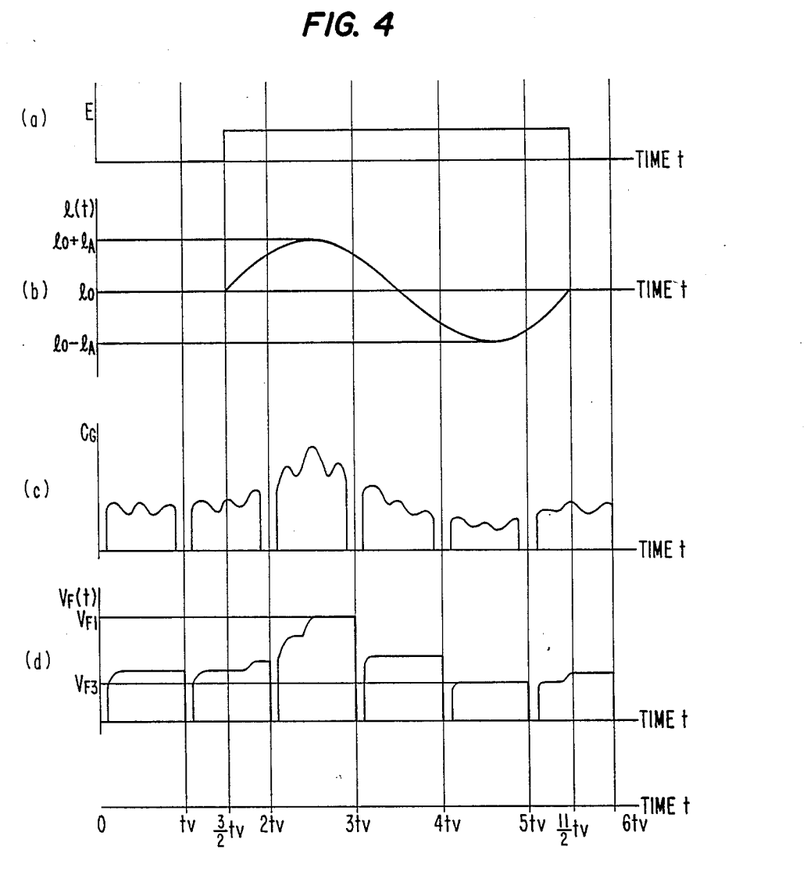
FIG. 4 is a schematic diagram for explaining a manner of executing an auxiliary oscillation and detecting an in-focus direction in the first embodiment.

The piezo-driving section 11 which has received such auxiliary oscillation execution signal E causes the CCD 3 to oscillate back and forth of the present position $l_o$, as shown in FIG. 4(b). At this time, the oscillation amplitude $l_A$ is set by the auxiliary oscillation amplitude signal A provided from the lens control section 6.

FIGS. 4(c) and (d) show time response waveforms of the high frequency component (the foregoing $C_G$) of the gated luminance signal produced in the focus signal detecting section 5 during auxiliary oscillation and of a focus voltage $V_F(t)$. The lens control section 6 compares the values of the focus voltage $V_F(t) F(V_F(3 tv) = V_{F1} V_F(5 tv) = V_{F3})$ at a pair of times (e.g. t=3 tv and t=5 tv) at which a positional displacement l(t) from the present position $l_o$ becomes maximum in the longitudinal direction, and thereby determines an in-focus direction. More specifically, assuming that $V_{F1}$ is larger than $V_{F3}$, as shown in FIG. 4(d), the lens control section 6 determines an in-focus direction so as to drive the CCD 3 in the direction of displacement at t=3 tv, that is, in a direction to increase the displacement l(t).

Figure 5:
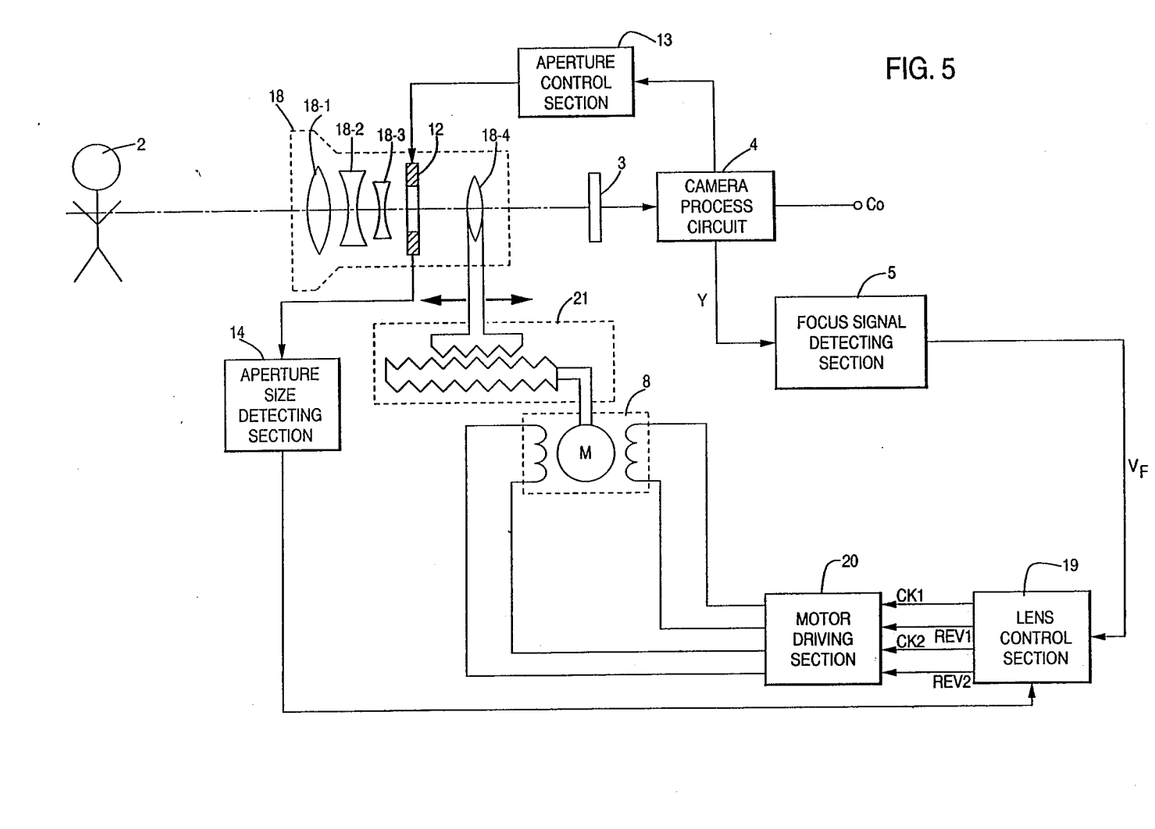
FIG. 5 is block diagram showing a video camera according to a second, embodiment of the present invention.

A second embodiment video camera of the present invention is illustrated in FIG. 5. Among the components of the second embodiment, those which may be common to components in the first embodiment are indicated by the same reference numerals. The point of the second embodiment resides in the construction of the zoom lens and means for executing the foregoing auxiliary oscillation, so only these will be explained below.

In FIG. 5, a zoom lens 18 is composed of, successively from the object side, a first lens group 18-1 having a positive refractive power, a second lens group 18-2 having a negative refractive power and also having an image magnification varying function, a third lens group 18-3 having a refractive power which substantially cancels the total refractive power of the first and second lens groups, and a fourth lens group 18-4 having a positive refractive power and also having a focusing fuction. Also in this embodiment, each lens group is represented by a single convex or concave lens for convenience' sake. The zoom lens 18 is a so-called "inner focus type zoom lens" wherein the fourth lens group 18-4 constitutes a focusing lens. The fourth lens group 18-4 may be composed of a plurality of lens elements, and all or a part of the lens elements may be moved for focusing.

Like the above first embodiment, the lens control section 19 holds two-field output values of the focus signal VF calculated in the focus detecting section 5, calculates a difference value ($\Delta V_F$) of the two, then judges an in-focus condition of the photographic lens on the basis of the sign and absolute value of the difference value $\Delta V_F$, and provides to a motor driving section 20 a clock signal CK1 and a forward-reverse signal REV1 which specify the driving speed and direction, respectively, of the stepping motor 8. The motor driving section 20 drives the stepping motor 8 in accordance with the clock signal CK1 and forward-reverse signal REV1. The stepping motor 8 causes the fourth lens group 18-4 of the zoom lens 18 to move up to a predetermined position through a transfer mechanism 21. In this way the in-focus control is executed.

The auxiliary oscillation is executed in the same cases as in the first embodiment. It is carried out in the following manner. A lens control section 19 once ignores the clock signal CK1 and forward-reverse signal REV1 which specify the driving speed and direction, respectively, of the stepping motor 8 in the in-focus control, and then provides to the motor driving section 20 a clock signal CK2 and a forward-reverse signal REV2 for oscillating the fourth lens group 18-4 of the zoom lens 18 back and forth only by a preset amplitude value. Thus, in this second embodiment, both in-focus control operation and auxiliary oscillation are controlled by the lens control section 19 so as to drive the fourth lens group 18-4 of the zoom lens 18 by using the stepping motor 8.

Now, how to control the auxiliary oscillation and the effect thereof in this embodiment will be explained with reference to FIG. 6. FIGS. 6(a) and (b) show waveforms with time of the clock signal CK2 and the forward-reverse signal REV2, respectively, which are provided from the lens control section 19. In this embodiment, the clock frequency of the clock signal CK2 is constant ($f_{CK}$ [Hz]) and hence the driving speed of the stepping motor also becomes constant. During time t=(5 tv/2) to (9 tv/2) (tv represents one field period, namely, 1/60 second in the case of NTSC system), the forward-reverse signal takes "H" level, for example, causing the stepping motor 8 to rotate in the forward direction, while at other times the signal REV2 takes low ("L") level, causing the stepping motor 8 to rotate in the reverse direction. In this embodiment the amplitude of the auxiliary oscillation is made variable according to conditions. This is realized by varying the clock frequency $f_{ck}$ while keeping the oscillation cycle constant.

The motor driving section 20 which has received such clock signal CK2 and forward-reverse signal REV2 drives the stepping motor 8 to oscillate the fourth group 18-4 of the zoom lens 18 back and forth of the present position ($L_o$) at an amplitude LA. FIG. 6(c) illustrates this waveform with time. It is at time:

$$t = (2k-1)\cdot tv \quad (k: \text{positive integer})$$

that a positional displacement L(t) of the fourth lens group 18-4 becomes maximum, and its absolute value (ΔL) is:

$$\Delta L = \alpha \cdot f_{ck} \cdot tv$$

wherein α represents an amount of movement of the fourth lens group 18-4 driven with one clock by the stepping motor 8.

Figure 6:
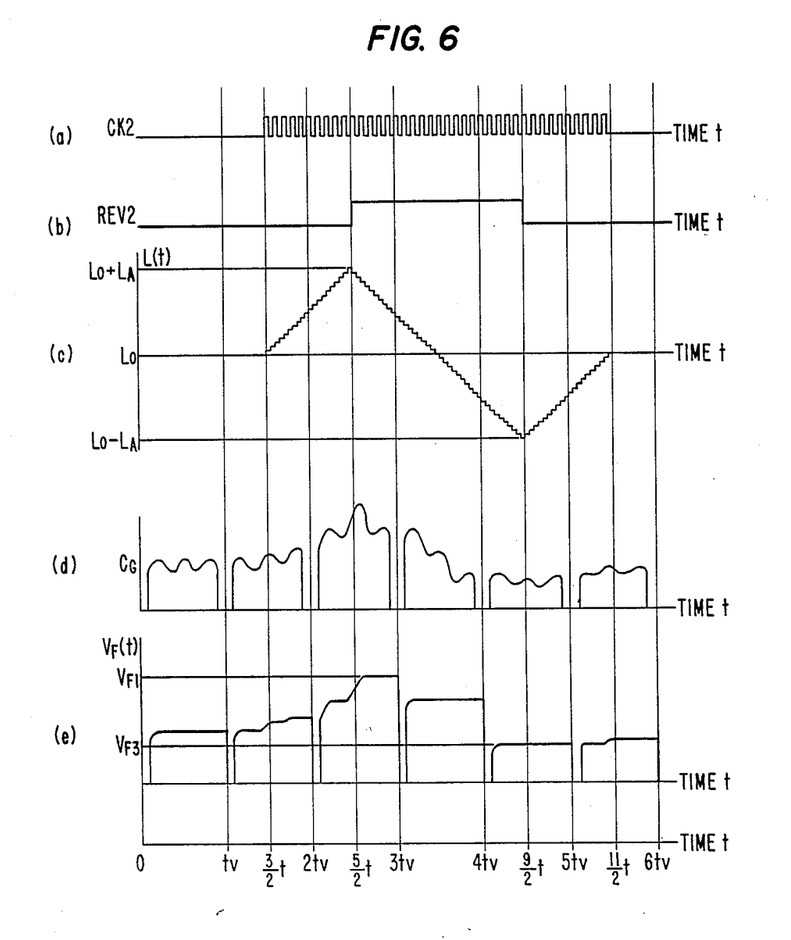
FIG. 6 is a schematic diagram for explaining a manner of executing an auxiliary oscillation and detecting an in-focus direction in the second embodiment.

FIGS. 6(d) and 6(e) show time response waveforms of the high frequency component (the foregoing $C_G$) of the gated luminance signal produced in the focus signal detecting section 5 and of the focus voltage $V_F(t)$.

The lens control section 19 compares the values of the focus voltage $V_F(t)$ provided from the peak detector 8 at a pair of times (e.g. t=3 tv and t=5 tv) at which the positional displacement L(t) from the present position $L_o$ becomes maximum in the longitudinal direction, and thereby determines an in-focus direction. Assuming that $V_F(3\ tv) = V_{F1}$ is larger than $V_F(5\ tv) = V_{F3}$, the lens control section 19 determines an in-focus direction so as to drive the fourth lens group 18-4 in the direction of displacement at t=3 tv, that is, in a direction to increase the displacement L(t).

Generally, with movement of a part of the photographic lens, there occurs a "change of field angle" which is a change in size of photographed image. Consequently, partial oscillation of the lens like the auxiliary oscillation may lead to recognition of a change of field angle and deterioration of the image quality. In this embodiment, however, since the lens moving portion for focusing is installed as the fourth lens group 18-4 having a focusing function behind a lens group having a weak focusing function, the auxiliary oscillation will cause too little change in field angle to be recognized.

Further, during execution of the auxiliary oscillation, there inevitably occurs blur caused by oscillation, which can be made less conspicuous in the present invention. More specifically, in this embodiment it is possible to set the oscillation cycle of the auxiliary oscillation to one several tength (1/several ten) second or so and the oscillation amplitude to approximately the depth of field of the photographic lens. Consequently, it is possible to reduce the recognition sensitivity to blur caused by the auxiliary oscillation.

According to the second embodiment, a simple construction permits detection of an in-focus direction and ensures realization of a stable and highly responsive automatic focusing.

There is another manner of automatic focusing which is performed by the same construction as in the above second embodiment and is different in the profile of auxiliary oscillation commanded by the lens control section.

Figure 7:
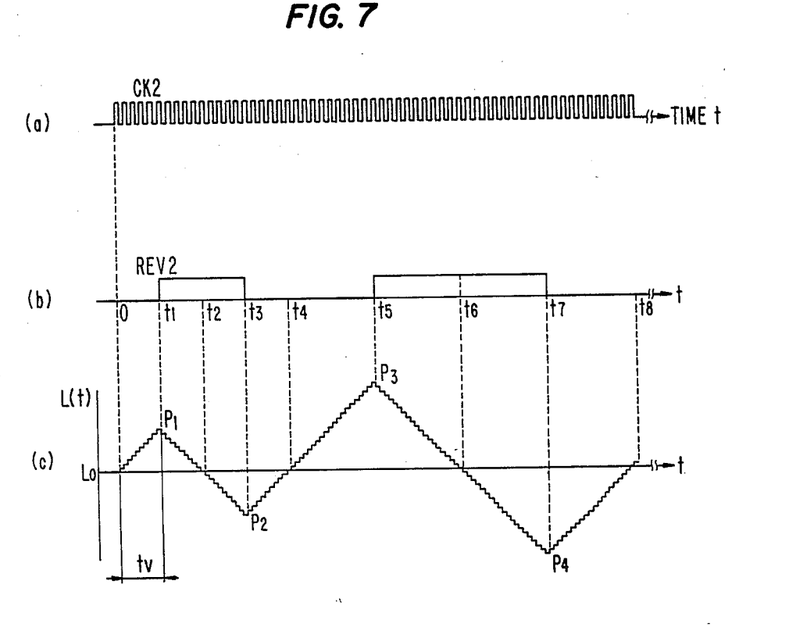
FIG. 7 is a schematic diagram for showing another manner of executing an auxiliary oscillation in the second embodiment.

An auxiliary oscillation operation in such manner will now be described with reference to FIG. 5 and FIG. 7. FIGS. 7(a) and (b) show waveforms with time of the clock signal CK2 and forward-reverse signal REV2, respectively, which are produced by the lens control section 19 shown in FIG. 5. In this case, the clock frequency of the clock signal CK2 is constant ($f_{ck}$ [Hz]) and hence the driving speed of the stepping motor 8 also becomes constant (assuming the drive frequency to be 2 $f_{ck}$ [pps]). The forward-reverse signal REV2 repeats "H" and "L" conditions and its cycle is increased with a power of two at every such repetition. More specifically, in FIG. 7(b), the forward-reverse signal REV2 assumes the state of "L" during the periods t=0 to $t_1$, $t_3$ to $t_5$ and $t_7$ to $t_8$ to rotate the stepping motor 8 in the forward direction, while it assumes the state of "H" during the periods t=$t_1$ to $t_3$ and $t_5$ to $t_7$ to rotate the stepping motor 8 in the reverse direction. Time intervals are set as follows:

$$t_1 = t_4 - t_3 = n/f_{ck}$$
$$t_2 - t_1 = t_3 - t_2 = n/f_{ck}$$
$$t_5 - t_4 = t_8 - t_7 = 2 \cdot n/f_{ck}$$
$$t_6 - t_5 = t_7 - t_6 = 2 \cdot n/f_{ck}$$

(n: integer)

Also after the time t=$t_6$, "H" and "L" level signals are outputted alternately while the repeating cycle increases with a power of two.

The motor driving section 20 which has received such clock signal CK2 and forward-reverse signal REV2 drives the stepping motor 8, which in turn causes the fourth lens group 18-4 of the zoom lens 18 to oscillate back and forth of the stop position $L_o$. FIG. 7(c) illustrates a waveform with time of a displacement L(t) of the fourth lens group 18-4. As the "H"-"L" repetition cycle of the forward-reverse signal REV2 increases with a power of two, the oscillation amplitude of the displacement L(t) also increases with a power to two.

The lens control section 19 compares the values of the focus voltage $V_F$ produced by the focus signal detecting section 5 at a pair of times ($t_1$ and $t_3$; $t_5$ and $t_7$ in FIG. 7) at which the displacement L(t) from the present position $L_o$ becomes maximum, and thereby determines an in-focus direction. Therefore, upon detection of an in-focus direction by comparison between the values of the focus signal VF at say t=$t_1$ and t=$t_3$, the auxiliary oscillation control is discontinued immediately and the fourth lens group 18-4 of the zoom lens 18 is moved in the detected direction; at the same time, the automatic focusing control based on in-focus control is restarted.

What is claimed is:

1. A video camera comprising:
 photographing means for picking up an image of an object, said photographing means comprising a photographic lens including a focusing lens for focusing a light from said object, and image pickup means for converting an image formed thereon by the light passed through said photographic lens to an electric signal;
 signal processing means for processing said electric signal to obtain therefrom a video signal;
 focus detecting means for detecting a focus condition of the image on said image pickup means from said video signal and outputting a focus signal indicative of the the detected focus condition;
 driving means for moving said focusing lens along an optical axis of said photographic lens thereby to adjust focus and for driving said photographing means to cause an auxiliary oscillation which is a cyclic change of the focus condition of the image on said image pickup means thereby to change said focus signal;
 control means for controlling said driving means such that said control means selectively sends either a command to said driving means to cause said auxiliary oscillation for a predetermined period to detect an in-focus direction in which said focusing lens is to be moved from a change of said focus signal caused by said auxiliary oscillation, or another command to said driving means to execute an in-focus control operation in which said focusing lens is moved by said driving means in said in-focus direction so that said focus condition becomes an optimum condition.

2. A video camera according to claim 1, wherein said focus detecting means extracts a high frequency component above a specific frequency of the video signal and produces said focus signal from said high frequency component.

3. A video camera according to claim 1, wherein said focus detecting means extracts a high frequency component above a specific frequency of said video signal, then calculates a maximum value of said high frequency component in each field of said video signal, and outputs said maximum value as said focus signal, and wherein said control means holds said focus signal and calculates a difference between the focus signals in successive fields, said focus condition being determined from said difference.

4. A video camera according to claim 1, wherein said control means has auxiliary oscillation means for oscillating said image pickup means back and forth of its present position along the optical axis of said photographic lens under control of said control means thereby to cause said auxiliary oscillation.

5. A video camera according to claim 1, wherein said driving means causes said focusing lens to oscillate back and forth of its present position along the optical axis of said photographic lens under control of said control means thereby to cause said auxiliary oscillation.

6. A video camera according to claim 1, wherein said auxiliary oscillation has a cycle corresponding to an integer multiple of a field period of said video signal, and said focus detecting means produces said focus signal in each field so as to obtain focus signals in a present position of said focusing lens relative to a position of said image pickup means and positions of the same before and behind said present position.

7. A video camera according to claim 1, wherein said control means causes said driving means to cause the auxiliary oscillation to detect said in-focus direction and thereafter causes said driving means to execute said in-focus control operation when the video camera is first supplied with electric power.

8. A video camera according to claim 1, wherein said control means causes said driving means to cause the auxiliary oscillation to detect said in-focus direction and thereafter causes said driving means to execute the in-focus control operation when the relative position between the object and the video camera has changed from a position providing an in-focus condition.

9. A video camera according to claim 1, wherein said control means causes said driving means to cause the auxiliary oscillation to detect an in-focus direction and thereafter causes said driving means to execute the in-focus control operation when the level of the focus signal has changed by a predetermined amount after an in-focus condition is once obtained.

10. A video camera according to claim 1, wherein said control means causes said driving means to cause the auxiliary oscillation continuously and continues to monitor the movement of the object and that of the video camera after an in-focus condition is once obtained, and thereafter, when the level of the focus signal has changed by a predetermined amount, said control means detects the in-focus direction and thereafter causes said driving means to execute the in-focus control operation.

11. A video camera according to claim 1, wherein, during said in-focus control operation, said control means causes said driving means to discontinue the in-focus control operation for a predetermined period of time to cause said auxiliary oscillation and to detect the in-focus direction, and thereafter again causes said driving means to execute the in-focus control operation according to the detected in-focus direction.

12. A video camera according to claim 11, wherein, when the level of the focus signal has reached a predetermined level or higher during said in-focus control operation, said control means causes said driving means to discontinue the in-focus control operation for a predetermined period of time and to cause said auxiliary oscillation to detect the in-focus direction, and thereafter again causes said driving means to execute the in-focus control operation.

13. A video camera according to claim 1, wherein said control means has stored therein a plurality of amplitude values for said auxiliary oscillation and it first causes said driving means to oscillate said focusing lens back and forth of its present position by at least one cycle at a minimum amplitude value out of said plural amplitude values, then causes said driving means to oscillate the focusing lens at each of the amplitude values while changing the amplitude value to larger values successively until said in-focus direction is detected.

14. A video camera according to claim 1, wherein said control means has stored therein a plurality of amplitude values for said auxiliary oscillation, and selects one of said plural amplitude values according to the illuminance of the object.

15. A video camera according to claim 1, wherein said control means has stored therein a plurality of amplitude values for said auxiliary oscillation, and selects one of said plural amplitude values according to the aperture size of a diaphragm attached to the photographic lens.

16. A video camera according to claim 1, wherein said control means has stored therein a plurality of amplitude values for said auxiliary oscillation, and selects one of said plural amplitude values according to the level of said focus signal detected by said focus detecting means.

17. A video camera according to claim 1, wherein the photographic lens is a zoom lens comprising, in the order from the object end, a first lens group having a positive refractive power, a second lens group having a negative refractive power and also having an image magnification varying function, a third lens group having a refractive power which cancels a total refractive power of said first and second lens groups, and a fourth lens group having a positive refractive power and also having a focusing function, and wherein said fourth lens group is used as said focusing lens.

* * * * *